(12) United States Patent
Itoh et al.

(10) Patent No.: US 7,218,221 B2
(45) Date of Patent: May 15, 2007

(54) THEFT DETERRENT SYSTEM

(75) Inventors: Kishiko Itoh, Machida (JP); Hideto Horikoshi, Sagamihara (JP); Masaki Oie, Machida (JP); Yuji Chotoku, Kawasaki (JP); Mark Cohen, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 198 days.

(21) Appl. No.: 11/116,012

(22) Filed: Apr. 27, 2005

(65) Prior Publication Data
US 2006/0244590 A1 Nov. 2, 2006

(51) Int. Cl.
*G08B 1/08* (2006.01)
(52) U.S. Cl. .............. 340/539.23; 340/539.1; 340/541; 340/568.1; 340/686.6; 340/571; 340/825.69
(58) Field of Classification Search .......... 340/539.23, 340/539.1, 540, 541, 568.1, 686.6, 571, 825.69; 235/383, 385; 348/143, 150, 153, 160
See application file for complete search history.

(56) References Cited

U.S. PATENT DOCUMENTS

| | | | | |
|---|---|---|---|---|
| 5,453,733 | A * | 9/1995 | Peterson et al. | 340/567 |
| 5,963,131 | A * | 10/1999 | D'Angelo et al. | 340/568.1 |
| 6,930,599 | B2 * | 8/2005 | Naidoo et al. | 340/539.1 |
| 6,956,473 | B2 * | 10/2005 | Hanood | 340/522 |

FOREIGN PATENT DOCUMENTS

| | | |
|---|---|---|
| JP | 092752 | 3/2002 |
| JP | 3091547 | 11/2002 |
| JP | 109127 | 4/2003 |
| JP | 240744 | 8/2004 |

* cited by examiner

*Primary Examiner*—Hung Nguyen
(74) *Attorney, Agent, or Firm*—Lieberman & Brandsdorfer, LLC

(57) ABSTRACT

A method and system are provided for detecting theft of a computer. A portable device is provided to wirelessly communicate with a theft deterrent function of the computer at a set frequency. In response to an increased distance between the portable device and the computer, a scan rate controller can automatically increase the scan rate for the wireless communication signal.

19 Claims, 3 Drawing Sheets

THEFT DETERRENT SYSTEM

BACKGROUND OF THE INVENTION

1. Technical Field

This invention relates to a theft deterrent system of a computing apparatus. More specifically, a method and apparatus are provided for changing the responsiveness of a theft deterrent function in relation to power consumption of the computing apparatus.

2. Description of the Prior Art

As technology advances, there is a strong desire for making electronic items smaller and more portable. Laptop computers are portable personal computers that can be easily carried from one location to another location. There is a need to secure laptop computers from theft as well as use by an unauthorized person, and to provide a theft deterrent system to mitigate access by an unauthorized person.

Japanese Patent Publication 2004-240744 to Tomoyuki discloses a monitoring device for movement of an item of interest. As disclosed, the '744 publication teaches a monitoring mode switched to an ON position in response to a relative location of the item of interest being moved. If the relative location of the item returns to a predetermined value, the monitoring mode is switched to a suspend mode. The '744 provides for one of two positions for monitoring an item, an ON position and a suspend position. Each of these positions is set in response to movement of a designated item of interest. However, there is no support for adjusting sensitivity of the monitoring mode after it has been switched to an ON position.

Japanese Patent Publication 2003-109127 to Yuukou et al. discloses a system for generating an alarm in response to theft of a portable article. There are two communication modules in the '127 alarm system. A first communication module is loaded on the portable article, and a second communication module is loaded on an article of a person. The first and second communication modules communicate through transmission of high frequency radio signals. While a high frequency signal is transmitted and received between the two communication modules and a burglar prevention mode is set to ON, a warning alarm remains silent. However, at such time as the portable article and the article of the person are separated beyond a tolerated distance and the high frequency signals between the two communication modules is not received, an alarm is generated. Accordingly, the '127 publication requires generation of high frequency signals at all times between the two communication modules when the alarm system is set and does not provide for adjustment of the frequency setting of the signals between the two communication modules.

Japanese Patent Publication 2002-092752 to Tokusho provides a device for a wireless theft detector of an object through a vibration sensor. A transmitting unit is provided to transmit a control signal to a receiving unit. An alarm is generated when it receives a signal from the vibration sensor or when it does not receive a communication from the transmitting unit. However, as in the '744 publication to Tomoyuki, there is no support in the '752 publication for adjusting the sensitivity of the control signal.

Each of the prior art publications discussed above utilize wireless communication between an item being monitored and a remote unit. In the each of these systems there is a constant transmission of radio signals between two units at a set frequency. Transmission of radio signals requires electricity. If the item being monitored has a battery supply, there is only a limited amount of electricity available for a limited amount of time. Most laptop computers come with batteries that deliver power to the computer when it is not otherwise receiving power from an alternative source. However, batteries have a limited amount of power, and when the power expires the battery requires recharging. There is no support or suggestion for enabling the communication of the radio signals between the two entities to be adjusted to compensate for a limited energy source. Accordingly, there is a need for a wireless system that monitors theft and/or vibration of a portable item while conserving energy and thereby extending the operable period of time.

SUMMARY OF THE INVENTION

This invention comprises a method and system for efficiently detecting a disturbance of a computing apparatus.

In one aspect of the invention, a theft deterrent system is provided with a computer that has an embedded processor. A portable device is also provided. The portable device supports wireless communication with a function of the theft deterrent system. In addition, the theft deterrent system includes a scan rate for confirming presence of a communication between the portable device and the theft deterrent function. The scan rate is automatically adjusted by a scan rate controller. A high frequency scan rate consumes more power than a low frequency scan rate.

In another aspect of the invention, a computer is provided with an embedded processor in communication with a theft deterrent function. A receiver is provided with the theft deterrent function to detect a wireless communication signal. The receiver detects the presence of the communication signal at a set rate. A controller is provided to automatically adjust the scan rate with knowledge that a high scan rate consumes more power than a low scan rate.

In yet another aspect of the invention, a method for detecting theft is provided. A scanning operation detects presence of a wireless communication between a portable device and a theft deterrent function of an embedded processor of a computer. A scan rate of the theft deterrent function is automatically adjusted to detect the communication. The theft deterrent function is released upon return of the portable device to the computer.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A computer is provided with an embedded processor and a theft deterrent function thereof. The computer supports wireless communication. In addition, a portable device is provided that supports wireless communication with the theft deterrent function from a remote location. The theft deterrent function includes a receiver that confirms communication between the theft deterrent function and the portable device. The receiver may function at a low frequency scan rate, a high frequency scan rate, or at any rate therebetween. A controller is provided to automatically adjust the scan rate of the receiver. For example, when the portable device is remote from the computer, the controller may increase the scan rate. Similarly, when the portable device is in close proximity to the computer, the controller may decrease the scan rate from a high setting to a low setting, or increase the scan rate from a low setting to a high setting depending upon the circumstances. Adjustment of the scan rate conserves power as a low frequency scan rate consumes less power that a high frequency scan rate.

Technical Details

Figure 1:
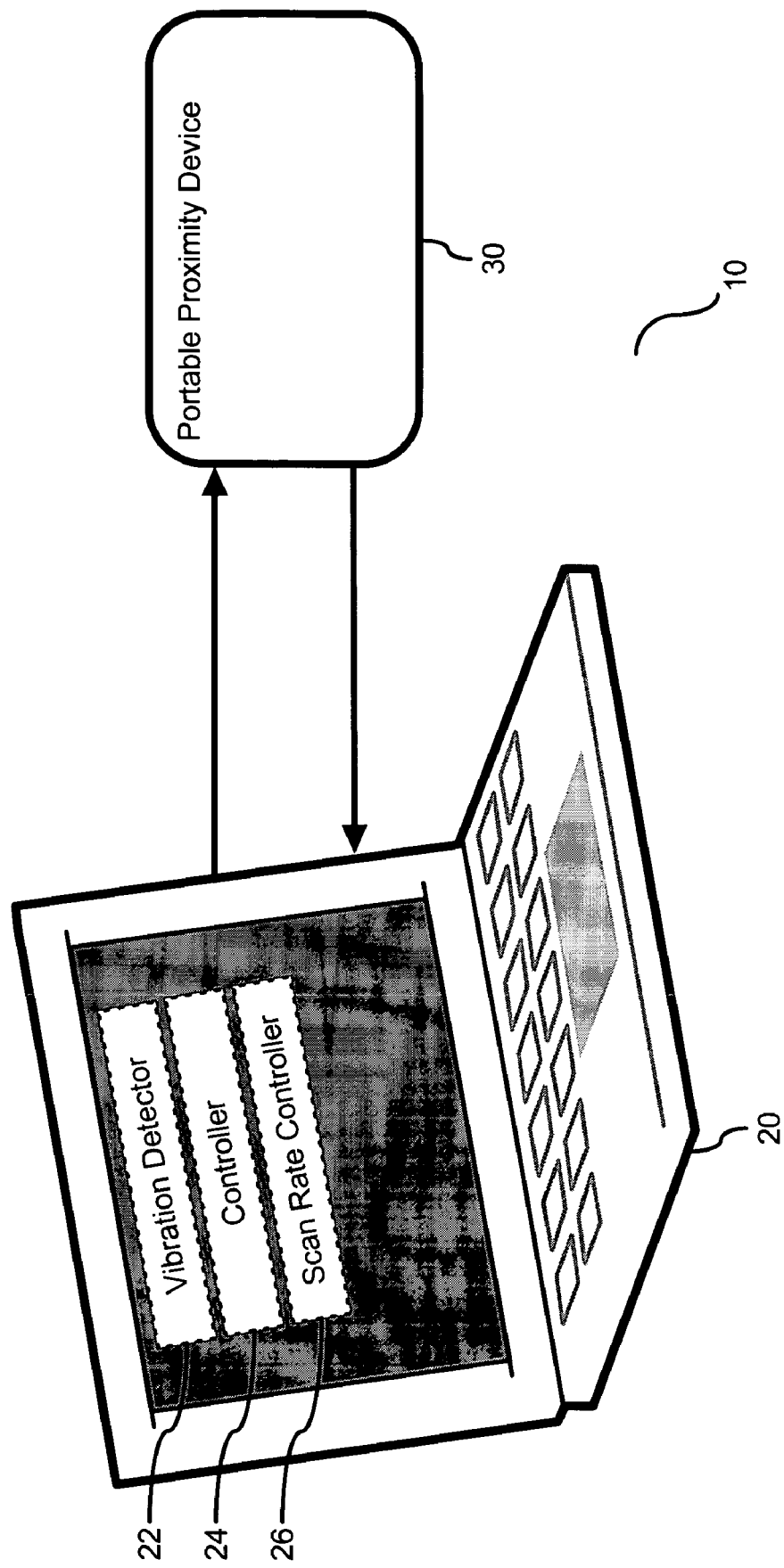
FIG. 1 is a block diagram of a theft deterrent function of a portable personal computer in communication with a portable proximity device.

FIG. 1 is a block diagram (10) of a theft deterrent system of a portable personal computer (20). As shown, the personal computer (20) includes a vibration detector (22) that produces a theft deterrent function through use of an embedded controller (24) in response to vibration, and a scan rate controller (26). To minimize false activation of the alarm, an authentication system is provided. As shown, a portable proximity device (30) is provided to support authentication of an authorized user. Both the personal computer (20) and the portable proximity device (30) have support for sending a communication, and the personal computer (20) also includes support for receipt of the communication from the portable proximity device (30). The controller (24) controls the setting of the theft deterrent function responsive to the communication. In one embodiment, the communication between the personal computer (20) and the portable proximity device (30) may be in the form of bluetooth radio transmissions. Standard recognition of whether the authorized user has approached the personal computer or has left the personal computer is based upon whether or not the portable proximity device (30), preferably secured to the user, is within communication range of the personal computer. In one embodiment, the portable proximity device (30) sends a communication in the form of a 'page' to the portable computer (20), which in effect enables the portable computer (20) to wait to receive the 'page' from the portable proximity device. The scan rate controller (26) adjusts the rate at which presence of communication between the personal computer and the portable proximity device (30) is confirmed. In the embodiment in which the portable proximity device (30) sends a 'page' and a personal computer (20) has a 'scan page' function to detect presence of the page, the scan rate controller (26) adjusts the rate at which the personal computer searches for presence of the page. Accordingly, the theft deterrent function utilizes communication with a portable proximity device to determine whether or not the theft deterrent function should be activated.

Figure 2:
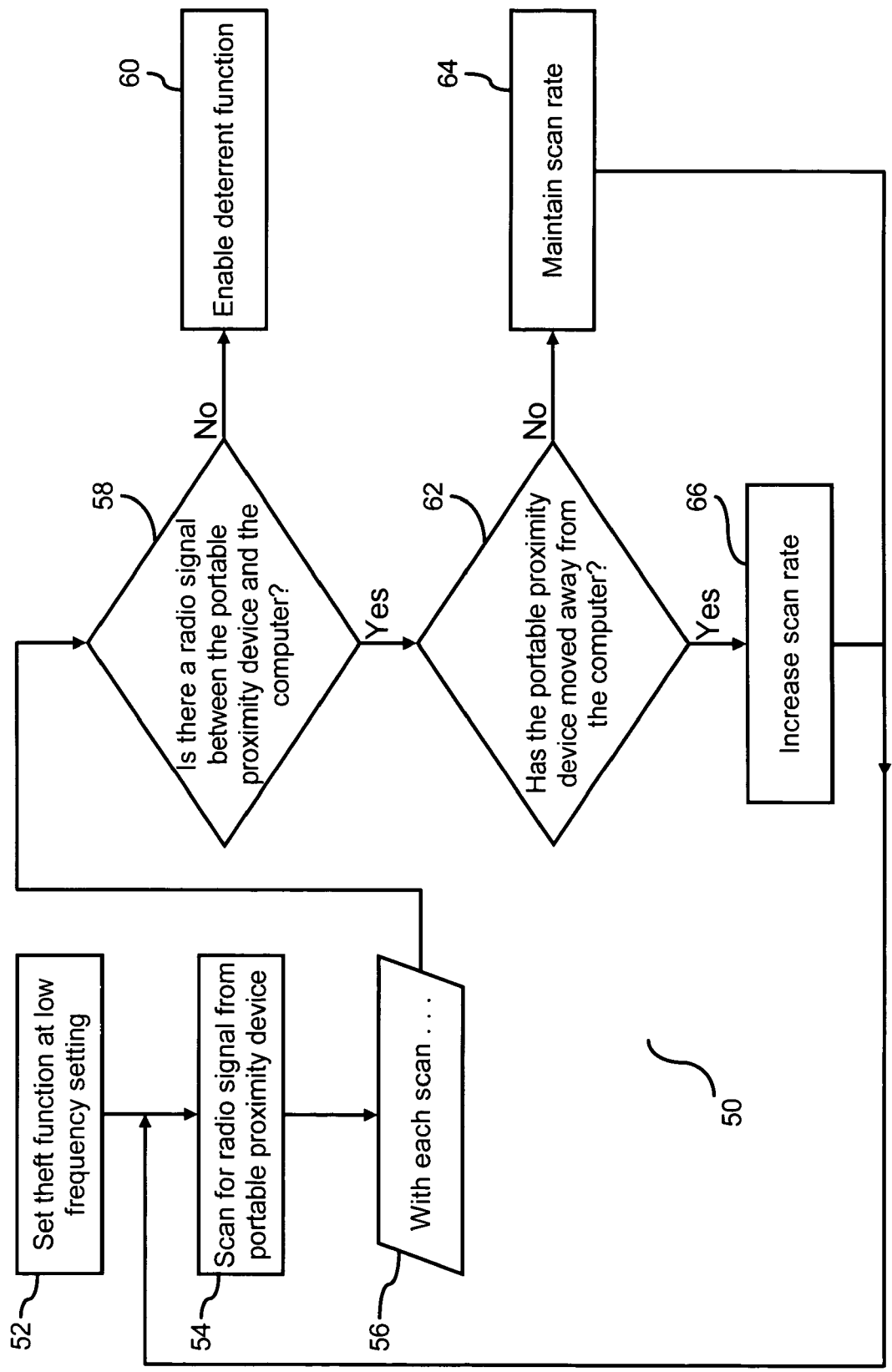
FIG. 2 is a flow chart of the operation of the theft deterrent function responsive to distance between the portable personal computer and the portable proximity device according to the preferred embodiment of this invention, and is suggested for printing on the first page of the issued patent.

FIG. 2 is a flow chart (50) illustrating use of the theft deterrent system in communication with a personal portable computer in response to detecting proximity of a portable proximity device. The portable proximity device is preferably secured to a person authorized to access the personal computer. The theft deterrent system includes a receiver that searches for a communication from a portable proximity device at a set frequency, or frequency window. A low frequency rate consumes less power than a high frequency rate. As such, if the personal computer has a limited power supply, a low frequency scan will consume less power than a high frequency scan. Prior to leaving the personal computer, the theft deterrent system is set with a scan rate set at a low frequency (52). Once the theft deterrent system has been set, both the personal computer and the portable proximity device are instructed to communicate at a set frequency. At set intervals established by the scan rate, the theft deterrent system scans for existence of the portable proximity device (54). With each scan (56), a test is conducted to determine if a communication between the portable proximity device and the personal computer has been detected (58). A negative response to the test at step (58) will result in enablement of the theft deterrent function (60), which may be in the form of an audible alarm, shutdown of the personal computer, or other security measure to protect access to information stored in or accessible through the personal computer. However, a positive response to the test at step (58) will result in a subsequent test to determine if the physical distance between the portable proximity device and the personal computer has increased beyond a preset threshold (62). In one embodiment, a measurement of intensity of communication between the portable proximity device and the personal computer may be the subject of the test at step (62). For example, if the intensity of the communication is decreasing, this may be an indication that the portable proximity device is moving away from the personal computer. Similarly, if the intensity of the communication is increasing, this may be an indication that the portable proximity device is moving toward the personal computer. However, measurement of intensity of communication is merely an example and is not a limiting factor as other forms of measurement may be employed. A negative response to the test at step (62) will result in the scan rate being maintained (64). However, a positive response to the test at step (62) will result in an increase of the scan rate for radio signals between the personal computer and the portable proximity device (66). Following steps (64) or (66), the process returns to step (54) for the next scan at the set scan rate. Once the portable proximity device has been returned to the computer there is no longer a need for the theft deterrent function which utilizes power from the personal computer, and the theft deterrent function may be disabled. Accordingly, the theft deterrent function is turned on and off based upon proximity of the portable device to the personal computer, with the frequency of the scan rate being automatically adjusted and controlled by a controller in communication with a radio wave receiver.

Figure 3:
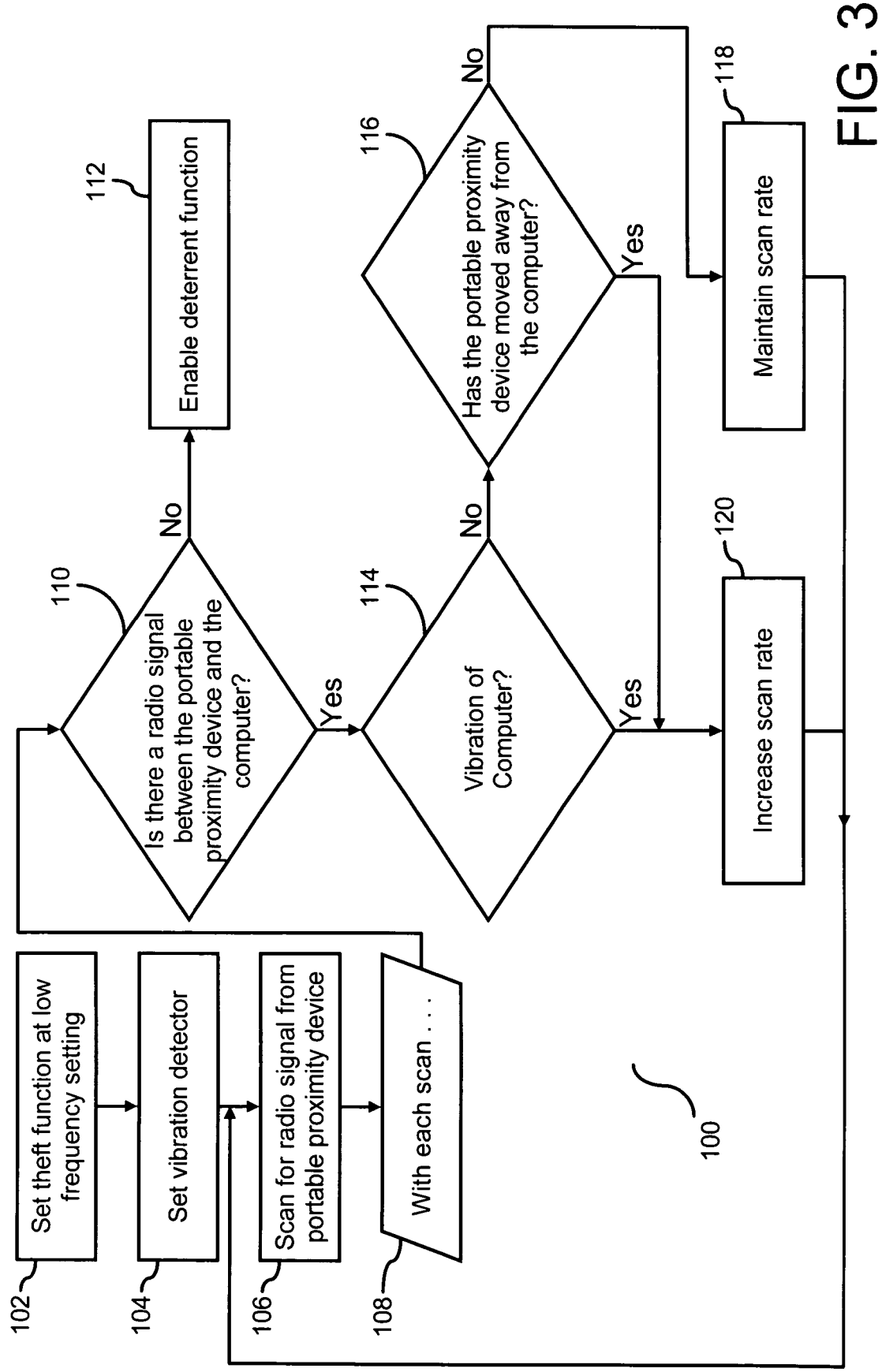
FIG. 3 is a flow chart of the operation of the theft deterrent function in response to vibration of the portable personal computer and distance between the personal computer and the portable proximity device.

FIG. 3 is a flow chart (100) illustrating use of the theft deterrent function in communication with a personal computer in response to detecting vibration of the terminal. The portable proximity device is preferably secured to a person authorized to access the personal computer. Similar to the embodiment shown in FIG. 2, the theft deterrent function includes a receiver that searches for communication at a set frequency, or frequency window. A low frequency rate consumes less power than a high frequency rate. As such, if the personal computer has a limited power supply, a low the frequency scan will consume less power than a high frequency scan. The theft deterrent function is set with a scan rate set at a low frequency (102), and the vibration detector is set (104). At intervals established by the scan rate, the theft deterrent function scans for a communication from the portable proximity device (106). With each scan (108), a test is conducted to determine if a communication between the portable proximity device of the personal computer has been detected (110). A negative response to the test at step (110) will result in enablement of a theft deterrent function (112), which may be in the form of an audible alarm, shutdown of the personal computer, or other security measure to protect access to information stored in or accessible through the personal computer. However, a positive response to the test at step (110) will result in a subsequent test to determine if a vibration of the personal computer has been detected (114). A negative response to the test at step (114) will result in a subsequent test to determine if the physical distance between the portable proximity device and the personal computer has increased beyond a preset threshold (116). The example of a measurement embodiment as described in association with step (62) of FIG. 2 may be employed into this illustrated example. A negative response to the test at step (116) will result in the scan rate being maintained (118). However, a positive response to the test at step (116) will result in an increase of the scan rate for communication between the personal computer and the portable proximity device (120). Similarly, a positive response to the test at step (114) will also result in an increase of the scan rate for communication between the personal computer and the portable proximity device (120). Following steps (118) and (120), the process returns to step (106) for the next scan at the set scan rate. Accordingly, the scan rate of the theft deterrent function may be automatically increased in response to a vibration of the personal computer as well as a determination that there has been an increased distance between the personal computer and a portable device in communication with the personal computer.

As shown in FIGS. 2 and 3, the controller increases the scan rate for communication in response to an increased distance between the portable proximity device and the personal computer or a sensed vibration of the terminal. When the proximity device is returned to the personal computer, the theft deterrent function may be disabled. However, the controller is not limited to increasing the scan rate. The controller may also decrease the scan rate from a higher scan rate setting in response to a decreased distance between the proximity device and the personal computer. Accordingly, the controller is set to automatically adjust the scan rate, i.e. increase or decrease, in response to a change in distance between the proximity device and the personal computer.

Advantages Over the Prior Art

The theft deterrent function shown in FIGS. 2 and 3 includes a controller that automatically adjusts the scan rate to determine presence of communication between the personal computer and the portable proximity device. A low scan rate utilizes less power than a high scan rate. By providing a function that adjusts the scan rate, the life of the battery of the portable computer may be extended. In addition, a higher scan rate reduces the time required to detect a communication signal. A lower scan rate may require as much as 100 seconds to detect presence of a communication signal, whereas a higher scan rate reduces the time to detect presence of a communication signal to 5 seconds, i.e. a 95% reduction in response time. Accordingly, adjustment of the scan rate by the controller leverages available battery and a higher scan rate, i.e. a fast response time, when a higher scan rate has been determined necessary by specified factors.

ALTERNATIVE EMBODIMENTS

It will be appreciated that, although specific embodiments of the invention have been described herein for purposes of illustration, various modifications may be made without departing from the spirit and scope of the invention. In particular, the communication between the portable proximity device and the computer may use bluetooth radio transmissions or other short range radio transmissions that support automatic adjustment of the associated scan rate, or an equivalent thereof. The portable proximity device is set to issue a communication in the form of a page, and the personal computer is configured to scan for the page. It is the scan rate of the portable computer that is adjusted, which affects the power usage of an associated battery. Additionally, the portable proximity device may encompass any portable item that can transmit and/or receive radio signals, and the portable personal computer may include any electronic item that can transmit and/or receive radio signals and has a controller that can adjust the scan rate of the communication signals. The theft function should not be limited to an auditory alarm. Rather, the theft function may include limited access within the personal computer, or even a shutdown of the personal computer. Finally, the embedded controller can be incorporated within the embedded processor. Accordingly, the scope of protection of this invention is limited only by the following claims and their equivalents.

We claim:

1. A theft deterrent system, comprising:
    a computer having an embedded processor which provides a theft deterrent function;
    a portable device adapted to support wireless communication with said theft deterrent function;
    a scan rate adapted to confirm presence of said communication; and
    a scan rate controller adapted to automatically adjust said scan rate, wherein a high frequency scan rate consumes more power than a low frequency scan rate.

2. The system of claim 1, wherein said scan rate is adapted to be increased in response to detection of an increase in distance between said portable device and said processor.

3. The system of claim 2, wherein said scan rate increase supports prompt detection when said portable device is in close proximity to said computer.

4. The system of claim 3, wherein said theft deterrent function is adapted to be released upon return of said portable device to said computer.

5. The system of claim 1, further comprising a vibration detector adapted to increase said scan rate responsive to a detected vibration of said computer.

6. The system of claim 5, wherein said scan rate increase supports prompt detection of said portable device when said portable device is near said computer.

7. The system of claim 1, further comprising a power consumption manager adapted to limit adjustment of said scan rate to a high level to a characteristic selected from a group consisting of: vibration, and range between said portable device and said processor.

8. The system of claim 1, wherein said theft deterrent function is adapted to be enabled in response to termination of communication between said portable device and said computer.

9. A computer, comprising:
    an embedded processor in communication with a theft deterrent function;
    said theft deterrent function having a receiver adapted to receive a wireless communication signal;
    said receiver detects presence of said communication signal at a set rate; and
    a controller adapted to automatically adjust a scan rate, wherein a high scan rate consumes more power than a low scan rate.

10. The computer of claim 9, wherein a scan rate increase supports a decrease in detection response time.

11. The computer of claim 9, wherein said theft deterrent function includes a vibration position adapted to increase said scan rate.

12. The computer of claim 9, wherein said theft deterrent function is enabled in response to termination of communication with said portable proximity device.

13. A method for detecting theft, comprising:
  scanning for presence of a wireless communication between a portable device and a theft deterrent function of an embedded processor of an computer;
  automatically adjusting a scan rate of said theft deterrent function to detect communication from said portable device with knowledge of a high scan rate consuming more power than a low scan rate; and
  enabling said theft deterrent function upon confirmation of termination of communication between said computer and said portable device.

14. The method of claim 13, further comprising increasing said scan rate in response to detecting an increase of distance between said portable device and said computer.

15. The method of claim 14, wherein the step of increasing said scan rate includes an increase in speed of detection response when said portable device is in vicinity of said computer.

16. The method of claim 15, further comprising releasing said theft deterrent function upon return of said portable device to said computer.

17. The method of claim 13, wherein said theft deterrent function includes a vibration setting adapted to increase said scan rate in response to a detected vibration of said computer.

18. The method of claim 17, wherein the step of increasing said scan rate includes an increase in speed of detection response when said portable device is in vicinity of said computer.

19. The method of claim 14, further comprising limiting adjustment of said scan rate to a high level to a characteristic selected from a group consisting of: vibration, and range between said portable device and said processor.

* * * * *